United States Patent [19]

Persson et al.

[11] Patent Number: 5,577,047
[45] Date of Patent: Nov. 19, 1996

[54] SYSTEM AND METHOD FOR PROVIDING MACRODIVERSITY TDMA RADIO COMMUNICATIONS

[75] Inventors: Bengt Persson, Djursholm; Håkan Eriksson, Vallentuna; Roland Bodin, Spånga, all of Sweden

[73] Assignee: Telefonaktiebolaget LM Ericsson, Stockholm, Sweden

[21] Appl. No.: 494,952

[22] Filed: Jun. 26, 1995

Related U.S. Application Data

[63] Continuation of Ser. No. 149,764, Nov. 10, 1993, abandoned.

[51] Int. Cl.⁶ .................................................. H04J 3/16
[52] U.S. Cl. ...................... 370/95.3; 370/84; 455/33.2; 379/60
[58] Field of Search .................. 370/95.1, 95.2, 370/95.3, 105.1, 105.2, 100.1, 84, 50; 379/59, 60; 455/33.1, 33.2, 33.4, 34.1, 34.2, 51.1, 54.1, 54.2, 56.1

[56] References Cited

U.S. PATENT DOCUMENTS

| | | | |
|---|---|---|---|
| 3,819,872 | 6/1974 | Hamrick | 179/41 |
| 4,797,947 | 1/1989 | Labedz | 455/33 |
| 4,947,452 | 8/1990 | Hattori et al. | 455/33.4 |
| 4,955,082 | 9/1990 | Hattori et al. | 370/95.1 |
| 5,095,531 | 3/1992 | Ito | 455/33 |
| 5,101,501 | 3/1992 | Gilhousen et al. | 455/33 |
| 5,109,390 | 4/1992 | Gilhousen et al. | 371/1 |
| 5,109,528 | 4/1992 | Uddenfeldt | 455/33.2 |
| 5,157,661 | 10/1992 | Kanai et al. | 370/95.1 |
| 5,195,090 | 3/1993 | Bolliger et al. | 370/94.1 |
| 5,212,806 | 5/1993 | Natarajan | 455/33.2 |
| 5,228,029 | 7/1993 | Kotzin | 370/95.1 |
| 5,260,989 | 11/1993 | Tenness et al. | 370/111 |
| 5,267,261 | 11/1993 | Blukeney et al. | 375/1 |
| 5,317,623 | 5/1994 | Sakamoto et al. | 379/60 |
| 5,327,576 | 7/1994 | Uddenfeldt et al. | 455/33.2 |

FOREIGN PATENT DOCUMENTS 0444485  9/1991  European Pat. Off. .

*Primary Examiner*—Douglas W. Olms
*Assistant Examiner*—Ajit Patel
*Attorney, Agent, or Firm*—Burns, Doane, Swecker & Mathis, L.L.P.

[57] ABSTRACT

A method and system for performing macrodiversity or soft handover in TDMA radiocommunication systems are described. Half rate transmissions are used to provide additional diversity communication channels in systems having insufficient timeslots at full rate. The mobile station can receive the same information from and/or transmit the same information to a plurality of base stations to provide diversity combination and improve transmission quality. The mobile unit assists in making handover decisions by monitoring the signal strength of control channels transmitted by base stations in neighboring cells.

25 Claims, 3 Drawing Sheets

SYSTEM AND METHOD FOR PROVIDING MACRODIVERSITY TDMA RADIO COMMUNICATIONS

This application is a continuation of application Ser. No. 08/149,764, filed Nov. 10, 1993 now abandoned.

BACKGROUND

In mobile radiocommunication systems, the capability is provided to transfer the handling of communications with a mobile station from one base station to another, as the mobile station changes its position and so moves out of the coverage range of one base station and into the coverage area of another base station. This process is commonly termed handover or handoff.

To smoothly complete a handover, the network controlling the base stations must first determine, for each mobile station, whether the need for handover is imminent and secondly determine to which new base station handover should be effected. In making the latter decision it is desirable that the network controller know either how well each base station can receive signals from a mobile station in question, or how well the mobile station in question can receive signals from each base station, or both.

Conventional mobile telephone systems were based largely on Frequency Division Multiple Access (FDMA), in which each base station transmits on a unique frequency within its current base station area. The mobile station is thus unaware of signals on other frequencies from surrounding bases. In FDMA systems it would be too costly to equip mobile stations with an extra receiver that could be used to scan other base frequencies. Instead, it was established practice that base stations are equipped with a scanning receiver that looks out for the signals of approaching mobile stations. The network then hands over a mobile from a base station covering an area it is leaving to the base station that reports the best reception of the mobile station's signal.

More recent cellular telephone standards employ Time Division Multiple Access (TDMA) in which a fixed time period (e.g., 20 mS) on each radio frequency is divided into a number (e.g., 3) of short timeslots (e.g., 6.6 mS) that are cyclically used by different mobile stations. Thus, a first mobile station transmits in the first timeslot in each period, a second mobile station transmits in the second timeslot in each period and so on. Likewise the base station transmits to one mobile station in the first timeslot, another mobile station in the second slot and so on. By offsetting the allocation of timeslots in the two communications directions, base to mobile (the downlink) and mobile to base (the uplink), it can be arranged that a first mobile transmits in the first timeslot and receives in the second timeslot; a second mobile transmits in the second timeslot and receives in the third, while a third mobile transmits in the third timeslot and receives in the first timeslot. An advantage of this arrangement is that a mobile station does not need to transmit and receive simultaneously, which facilitates sharing a single antenna.

In the above three-timeslot example, each mobile station is active to transmit or receive in two of the three timeslots and idle in the remaining timeslot. Therefore it is possible for TDMA mobile stations to use this idle time to search for signals from other base stations and measure their signal strength. By reporting these signal strength measurements to the base station using a low speed data channel multiplexed with the traffic (i.e., voice), the network is informed about the base stations each mobile station can receive. The network can use this information to effect handover to the best base station, and such a system is termed mobile assisted handover (MAHO). When the base stations scan for the signal strength of mobile stations, the system could be termed base assisted handover (BAHO). Several types of handoff or handover can be executed by a mobile station under control of the intelligent network controller.

For example, a first type, called an internal handover, occurs when the network decides to keep the mobile station connected to its current base station for traffic sharing or capacity optimization reasons, but to switch transmissions from the mobile station to another frequency or timeslot. If a frequency or timeslot change is commanded, a slight interruption in traffic will occur while the mobile station acquires synchronization on the new frequency.

A second type of handover, called external handover, occurs when the network decides to transfer the mobile station to another base station, which in conventional mobile telephone systems implies change of frequency or timeslot. This may also introduce a slight interruption in traffic and a risk of losing the call if the new radio channel experiences interference.

A third type of handover is the transfer of a mobile station to another base station without a frequency change. This handover has the potential to be a so-called glitch-free or seamless handover that involves no interruption of traffic whatsoever. Systems in which multiple base stations are simultaneously connected to one mobile station to provide information relating to the same connection are commonly called macrodiversity or soft handover systems. The base stations transmit the same signal to the mobile station which then combines the two signals.

One way in which conventional macrodiversity systems operate is to use the same communication channel between a mobile station and all base stations involved in a particular connection. A communication channel can be characterized by at least one of its frequency, timeslot or code depending on the multiple access method employed by the system, e.g., FDMA, TDMA and CDMA. In these types of simulcast systems, signals from the various base stations are handled by the mobile as different transmission paths.

Another method in which macrodiversity systems operate is to use different communication channels between the mobile station and the various base stations. In TDMA systems, this means different timeslots and/or frequencies. Unfortunately, several existing TDMA radiocommunication systems, e.g., GSM and ADC, have relatively few timeslots per frame. Typically these timeslots are already fully used by the mobile station for reception of signals from a base station, transmission of signals to the base station and MAHO measurements of signal quality of adjacent base stations.

Since there is no capacity left for handling another communication channel on another timeslot, achieving macrodiversity in such TDMA systems generally requires using the same timeslot on the same or a different frequency as another communication channel. An approach which uses the same timeslot on the same frequency has the drawback that it uses synchronized base stations.

Using the same timeslot on a different frequency implies that the mobile station can only receive one of the base stations at a time. Thus, the mobile selects one of the base stations based on, for example, the quality of the last received timeslot.

SUMMARY

These and other drawbacks and difficulties are overcome according to systems and methods for radiocommunication according to the present invention which provides additional timeslots to existing TDMA systems so that mobiles can receive and combine different channels.

BRIEF DESCRIPTION OF THE DRAWINGS

These and other objects, features, and advantages of the present invention will become more apparent by reading the following detailed description in conjunction with the drawings in which.

DETAILED DESCRIPTION

Figure 1:
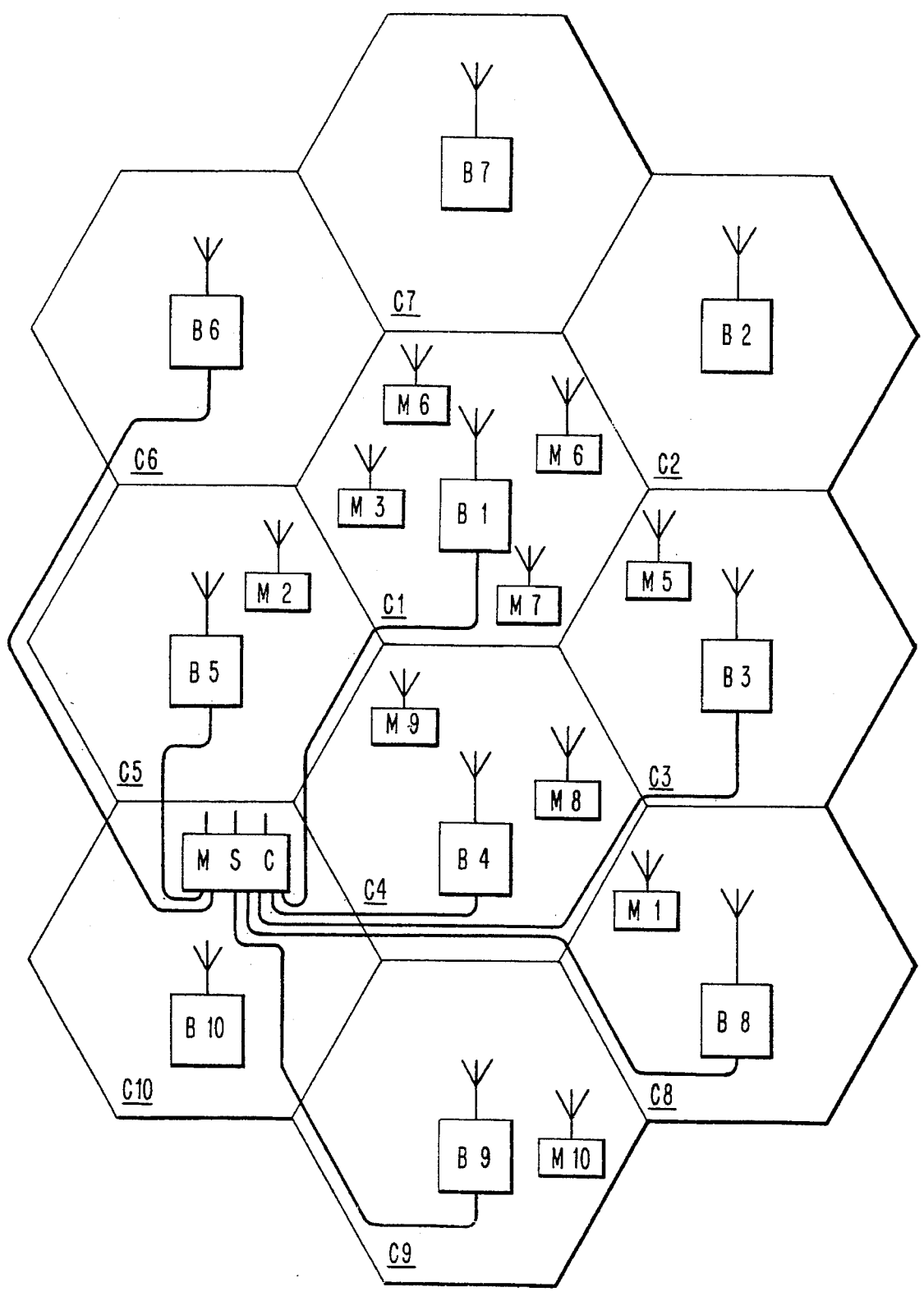
FIG. 1 illustrates an exemplary cellular radiocommunication system.

FIG. 1 illustrates ten cells C1 to C10 in an exemplary cellular mobile radio system. For each cell C1 to C10 there is a corresponding base station, denoted B1 to B10. The base stations are situated in the center of the cells and have omnidirectional antennas. Ten mobile stations, M1–M10, are also shown. They may be automobile installed and powered by the vehicle's electric power system, or small, lightweight, battery-powered handportable stations.

The mobile stations are moveable within a cell and from one cell to another. A mobile services switching center, abbreviated MSC, is connected to all the base stations by cables or any other fixed means, such as a radio link. Some of these cables are omitted in FIG. 1 for simplicity. The MSC is also connected by cables or links to a fixed public telephone network or a similar fixed communication network.

During operation the mobile stations will be in contact with the fixed part of the system by transmission of radio signals to, and reception of radio signals from, the different base stations. Telephone calls, data communication links or other communication paths can be set up between one mobile station and another mobile station in the system. Calls can also be set up to mobiles in another system or subscribers in the fixed network. For the purposes of this discussion, all of these situations are called connections irrespective of whether they originate or end in a mobile station.

The exemplary system of FIG. 1 is, of course, a simplification as normally the system will comprise more cells and base stations. There can, for example, be umbrella cells each covering an area also covered by a group of micro cells. Also the number of mobile stations will normally be much larger. Base stations located in the vicinity of the cell borders and with sector antennas are also common. Several other MSCs with connected base stations will also normally exist and the mobile stations are usually also free to communicate via these other MSCs.

Figure 2A:
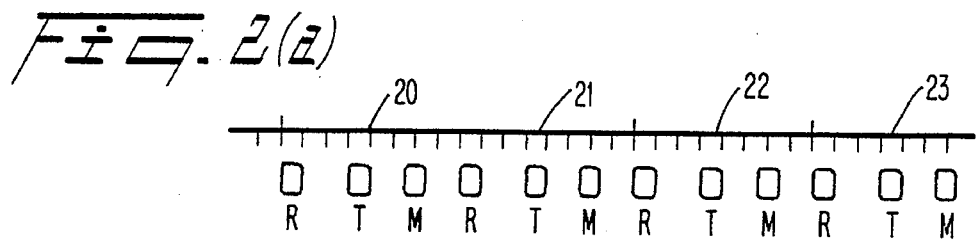
FIGS. 2(a) and 2(b) are frame/timeslot representations of transmissions at full rate and half rate, respectively.

Referring now to FIG. 2(a), frame usage for a full-rate channel at a mobile station is illustrated in a time-line fashion wherein R, T, and M represent periods during which the mobile is receiving, transmitting, or measuring, respectively. Note that in the example of FIG. 2(a), each frame 20, 21, 22, and 23 consists of eight timeslots and that reception and transmission use different frequency bands, i.e., frequency division duplex. The receiving, transmitting, and measuring activities effectively use all of the mobile station's available time in the frame since some guard time is allocated for synthesizer switching and amplifier ramping up and ramping down. This usage is typical for conventional TDMA systems, e.g., GSM and ADC.

Figure 2B:
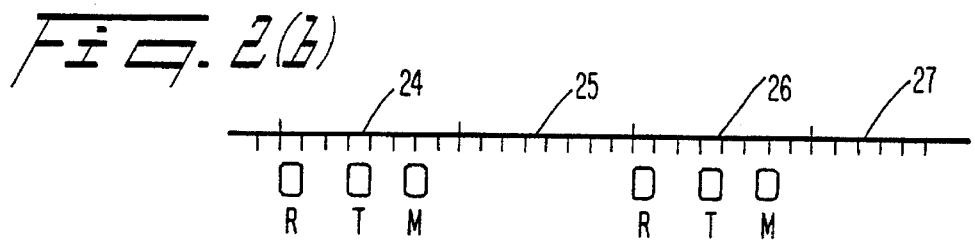

A half-rate channel is illustrated in FIG. 2(b). Note that only every other frame, i.e., 24 and 26, are used by the mobile station which is idle in frames 25 and 27. Thus, according to the present invention, in half rate channels, these idle periods can be used to achieve macrodiversity and provide a soft handover as described below.

A mobile station can receive and transmit on another channel (on the same or different frequency) using the idle timeslots in a half rate communication. This additional channel can then be used to communicate with another base station. Moreover, the two base stations which are providing the same information to the mobile station need not be synchronized because it is not necessary to use the same timeslot for both channels.

Figure 3A:
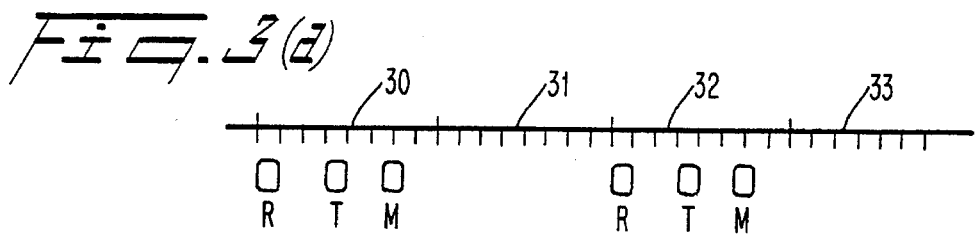
FIGS. 3(a) and 3(b) are frame/timeslot representations of base station transmissions according to an exemplary embodiment of the present invention.
Figure 3B:
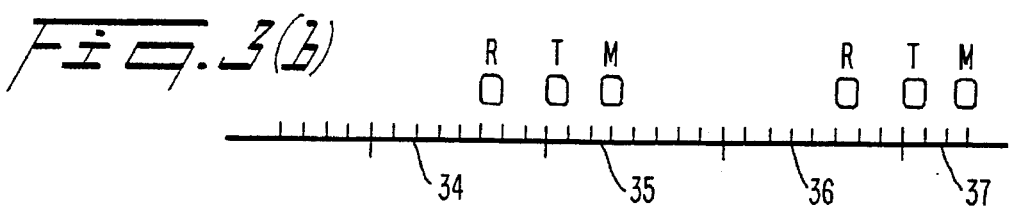

FIGS. 3(a) and 3(b) illustrate this feature of the present invention. FIG. 3(a) shows frames 30, 31, 32, and 33 and timeslot usage of these frames by a first base station which is transmitting information at half-rate to a mobile station. Similarly, FIG. 3(b) shows timeslot usage of a second base station transmitting the same information to a mobile station on frames 34, 35, 36, and 37 at half rate. Note that the frames in FIGS. 3(a) and 3(b) are shown as being offset by 3.5 timeslots to indicate that the base stations need not be time synchronized.

Thus, for the example shown in FIGS. 3(a) and 3(b), the mobile station uses slot 0 for receiving from the first base station and slot 6, on some other frame, for receiving from the second base station. Those skilled in the art will appreciate that the slots selected in FIGS. 3(a) and 3(b) are purely illustrative and that many combinations of timeslots can be selected. The mobile station can determine which slot or slots can be used when synchronizing to the base stations during MAHO measurements and can include this determination as information sent to the base stations during the measurement reports. The timeslots are selected so that the active timeslots (receive and transmit) do not overlap at the mobile station and have enough separation therebetween for changing frequency between bursts, if required.

When the mobile station synchronizes to the adjacent base stations during the MAHO measurement procedure, it can measure the time offset between the TDMA frames of the adjacent and the current base station. The mobile can then determine which of the timeslots on the new base station can be used in combination with the current channel. Alternatively, the offset can be sent to the base station, which can make the determination.

Figure 4A:
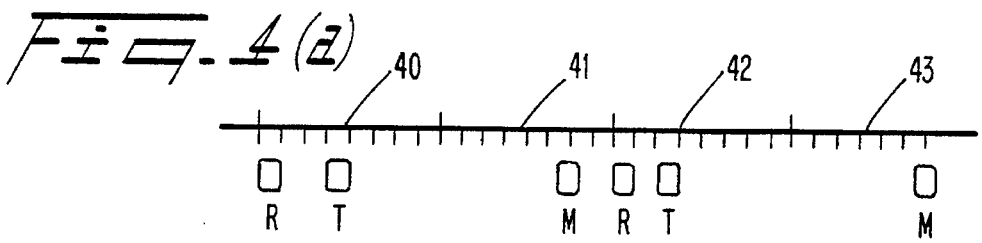
FIGS. 4(a) and 4(b) are frame/timeslot representations of base station transmissions according to another exemplary embodiment of the present invention.
Figure 4B:
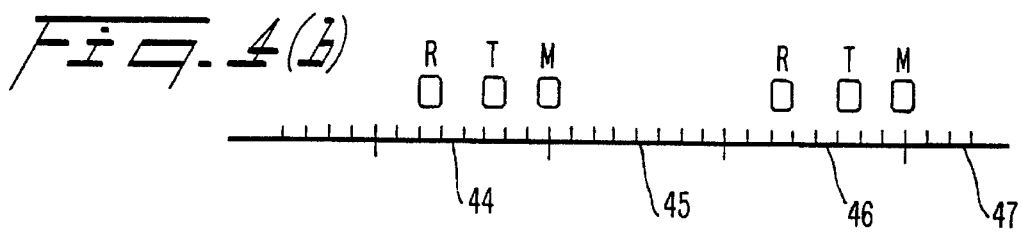

More flexibility in timeslot selection can be provided by moving or deleting some measurement phases. An example of this feature of the present invention will now be described with respect to FIGS. 4(a) and 4(b).

As with FIGS. 3(a) and 3(b), FIGS. 4(a) and 4(b) illustrate timeslot usage of two base stations which are transmitting the same information to a mobile station at half of a normal full rate communication channel, e.g., every other frame period, as seen by frames 40–43 and 44–47, respectively. In this exemplary embodiment, however, the measurement phase seen in frame 30 of FIG. 3(*a*) has been delayed, i.e., moved to frame 41, in the base station half rate channel illustrated in FIG. 4(*a*). As a result, the receive, transmit and measurement phases of the second base station illustrated in FIG. 4(*b*) have been moved up several timeslots in comparison to the transmission of the second base station shown in FIG. 3(*b*).

Having received plural signals containing the same information, these signals can be combined using, for example, an equalizer. Using the information from two signal sources, a better received signal can be determined. As a result log-normal shadowing type fading can be reduced so that the fading margin can be reduced. This will increase the cell coverage and allow closer channel reuse distance and increased capacity.

Exemplary embodiments of a mobile unit and a base station will now be described in conjunction with FIGS. 5 and 6, respectively.

Figure 5:
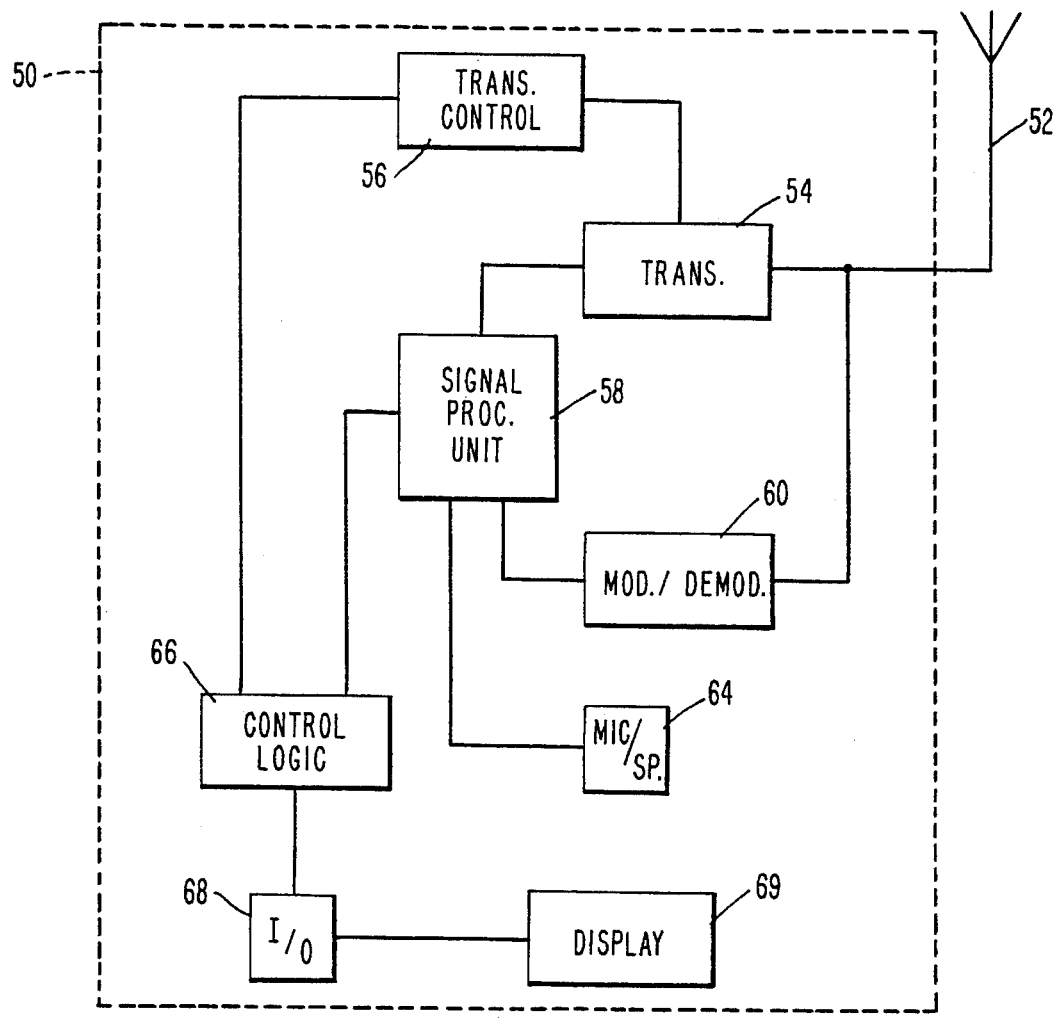
FIG. 5 is a block diagram of an exemplary mobile station according to the present invention.

In FIG. 5, the mobile station 50 has an antenna 52. A transmitter 54 is connected to the antenna 52 and is controlled by a transmitter control unit 56. The transmitter is also connected to a signal processing unit 58. A receiver 60 is also connected to the antenna and is used in time multiplex together with the transmitter 54. The receiver 60 is also connected to the signal processing unit 58. Radio equipment for modulating, demodulating and equalizing purposes is included in the blocks 54 and 60. The signal processing unit 58 includes, for example, circuitry for channel coding, channel decoding and signal processing of incoming and outgoing speech. The signal processing unit 58 is also connected to a microphone and speaker in block 64, and to control logic 66. In turn, the control logic 66 is connected to the transmitter control unit 56 and to I/O-block 68 which processes the I/O signals from a keyboard (not shown) and to a display 69.

Figure 6:
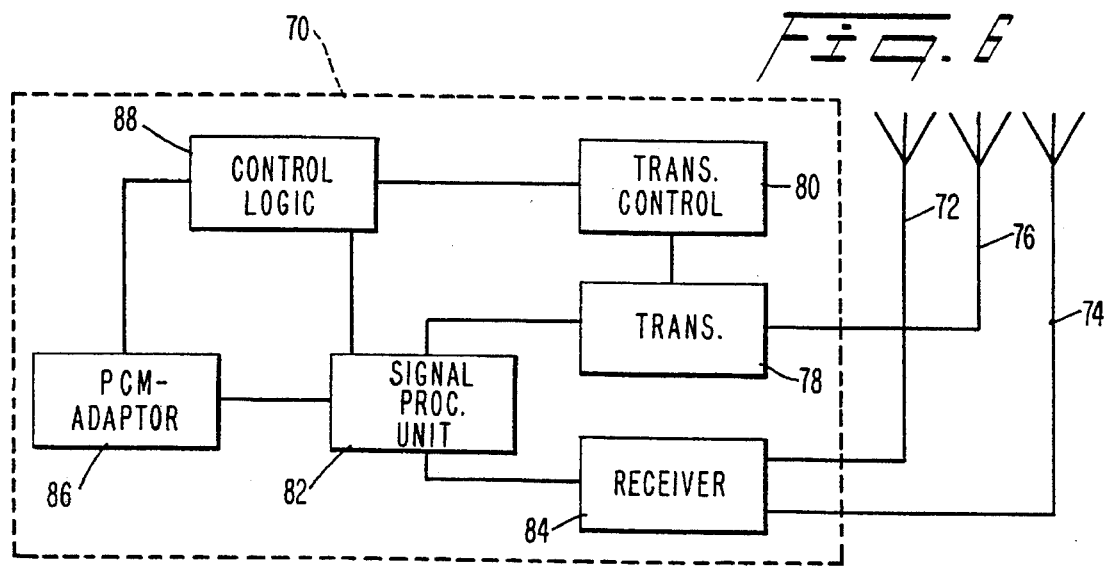
FIG. 6 is a block diagram of an exemplary base station according to the present invention.

FIG. 6 is a block diagram illustrating an exemplary base station. Although the block diagram of FIG. 6, is illustrated as a single system, those skilled in the art will readily appreciate that the hardware shown in FIG. 6 can also be distributed over several units, for instance over a base station and a base station controller.

The base station, generally referred to by reference numeral 70, has three antennas, of which two, 72 and 74, are used for receiving signals, whereas only one antenna 76, is used to transmit signals. A transmitter 78 is connected to the antenna 76 and is controlled by a transmitter control unit 80. The transmitter 78 is also connected to the signal processing unit 82. A receiver 84 is also connected to the antennas 72 and 74 and the signal processing unit 82. Radio equipment for modulating, demodulating, equalizing, and diversity combining purposes is included in the blocks 78 and 84. The signal processing unit 82 provides for channel coding and decoding and processing speech in the incoming and outgoing directions. The signal processor unit 82 is also connected to the PCM-link adaptor block 86 and to the control logic 88. In turn, the control logic 88 is connected to the transmitter control unit 80 and to the signal processing unit 84.

While the present invention has been described with reference to exemplary embodiments thereof, these exemplary embodiments are intended to be merely illustrative of the present invention rather than limitive. For example, although the above-described exemplary embodiments have been described in terms of mobile stations, the present invention can be implemented using any type of remote station (e.g., portable units, PCS devices, data terminals, etc.).

Moreover, while the present invention has been described in terms of using half rate channels to provide the additional channels for diversity communication, those skilled in the art will readily appreciate that other means for providing such additional channels, such as time division duplexing, can be used. Thus, the present invention encompasses any and all modifications which are within the spirit and scope of the present invention as set forth in the appended claims.

What is claimed is:

1. In a TDMA radiocommunications system including at least one remote station and at lease two base stations, a method of communicating with said at least one remote station from a first and a second of said at least two base stations comprising the steps of:

transmitting a first signal on a first TDMA channel from said first base station to said remote station;

measuring, by the remote station, a time offset between signals received from said first and second base station and determining an appropriate timeslot for a second TDMA channel based on said measured time offset;

transmitting a second signal on said second TDMA channel from said second base station to said remote station, where said second signal includes substantially the same information as said first signal; and receiving, at said remote station, said first and second signals transmitted from said first and second base stations.

2. The method of claim 1, wherein said first and second frequencies are the same frequency.

3. The method of claim 1, further comprising the step of:

combining said first and second received signals to produce a combined signal for further processing.

4. The method of claim 1, further comprising the step of:

selecting one of said first and second received signals for further processing.

5. The method of claim 1, further comprising the steps of:

sending a transfer indication from said first base station to said second base station, and transmitting said second signal from said second base station to said remote station upon receipt of said transfer indication.

6. A method for providing macrodiversity in a TDMA radiocommunication system comprising the steps of:

providing, in said radiocommunication system, half rate channels for carrying data between remote and base stations;

measuring a time offset between transmitted signals received from said first and second base stations;

assigning a first half rate channel to a first base station based on said measured time offset;

transmitting a first signal carrying information associated with a connection from said first base station to one of said remote stations using said first half rate channel; and transmitting a second signal carrying said information from a second base station to said one of said remote stations using another of said half rate channels.

7. The method of claim 6, wherein said one and said another of said half rate channels comprise different timeslots on a common frequency.

8. The method of claim 6, wherein said one and said another of said half rate communication channels comprise different timeslots on different frequencies.

9. The method of claim 6, further comprising the steps of:

terminating transmission of one of said first and second signals while continuing to transmit another of said first and second signals.

10. The method of claim 6, wherein said step of transmitting further comprises the step of:

synchronizing said first and second base stations.

11. The method of claim 6, wherein said step of transmitting further comprises the step of:

transmitting said first and second signals without synchronizing said first and second base stations.

12. The method of claim 6, further comprising the step of:

combining said first and second transmitted signals to produce a combined signal for further processing.

13. The method of claim 6, further comprising the step of:

selecting a higher quality one of said first and second transmitted signals for further processing.

14. A TDMA radiocommunications system comprising:

a remote station;

at least two base stations;

means, disposed in said mobile station, for measuring a time offset between signals received from said at least two base stations;

a plurality of TDMA channels;

means, disposed in a first of said at least two base stations, for transmitting a first signal on a first of said plurality of TDMA channels to said remote station;

means, disposed in said second base station, for transmitting a second signal on a second of said plurality of TDMA channels from said base station to said remote station wherein said second signal includes substantially the same information as said first signal;

means, disposed in said remote station, for receiving said first and second signals transmitted from said first and second base stations; and means, responsive to said measured time offset between signals from said first and second base stations as received in said remote station, for assigning said second TDMA channel to said second base station.

15. The system of claim 14, wherein said first and second communication channels use the same frequency.

16. The system of claim 14, further comprising:

means for combining said first and second signals to produce a combined signal for further processing.

17. The system of claim 14, further comprising:

means for selecting a higher quality one of said first and second signals for further processing.

18. The system of claim 14, further comprising:

means for sending a transfer indication from said first base station to said second base station, where said transmitting means disposed in said second base station transmits said second signal to said remote station upon receipt of said transfer indication.

19. A macrodiversity system for use in a TDMA radiocommunication system comprising:

half rate communication channels in said system for carrying data between remote and base stations;

means, disposed in a first of said base stations, for transmitting a first signal carrying information associated with a connection between said first base station and one of said remote stations using one of said half rate communication channels;

means, disposed in a second of said base stations, for transmitting a second signal carrying said information associated with said connection using another of said half rate channels;

means, disposed in said remote station, for measuring a time offset between signals received from said first or second base stations, and means for assigning at least one of said one and said another half rate channels, respectively, to said first or second base station based on said measured time offset.

20. The system of claim 19, wherein said one and said another of said half rate communication channels comprise different timeslots on a common frequency.

21. The system of claim 19, wherein said one and said another of said half rate communication channels comprise different timeslots on different frequencies.

22. The system of claim 19, further comprising:

means for terminating transmission of one of said first and second signals while continuing to transmit another of said first and second signals.

23. A method for providing macrodiversity in a TDMA radiocommunication system comprising the steps of:

providing, in said radiocommunication system, half rate channels for carrying data between remote and base stations;

dividing said half rate channels into a plurality of time slots grouped into frames;

designating every other frame as an idle frame;

transmitting a first signal carrying information associated with a connection from a first base station to one of said remote stations using one of said half rate channels;

transmitting a second signal carrying said information from a second base station to said one of said remote stations during idle frames of said one of said half rate channels using another of said half rate channels.

24. A macrodiversity system for use in a TDMA radiocommunication system comprising:

half rate communication channels divided into a plurality of time slots grouped into frames, wherein every other frame is designated as an idle frame for carrying data between remote and base stations;

means, disposed in a first of said base stations, for transmitting a first signal carrying information associated with a connection between said system and one of said remote stations using one of said half rate communication channels; and means, disposed in a second of said base stations, for transmitting a second signal during idle frames of said one of said half rate channels carrying said information associated with said connection between said system and said one of said remote stations using another of said half rate channels.

25. A mobile station for use in a TDMA communication system comprising:

a receiver for receiving a first half rate TDMA communication channel and a second half rate TDMA communication channel, wherein said second half rate TDMA communication channel conveys substantially the same information as said first half rate TDMA communication channel and is received during idle frames of said first half rate TDMA communication channel; and means for determining a received signal using information from both said first and said second half rate TDMA communication channels.

* * * * *